US012752931B2

(12) United States Patent
Nunes et al.

(10) Patent No.: US 12,752,931 B2
(45) Date of Patent: Oct. 6, 2026

(54) TRANSLATING BARRIER FOR AN AIRCRAFT

(71) Applicant: The Boeing Company, Arlington, VA (US)

(72) Inventors: Daniel Bryan Nunes, Snohomish, WA (US); Steven Ellis Rhynard, Mukilteo, WA (US); Gregory Staton Smith, Edmonds, WA (US); Hakeem Haj-Musa, Bellevue, WA (US); Justin Tabora, Bothell, WA (US); Paul Addis, Bothell, WA (US)

(73) Assignee: THE BOEING COMPANY, Arlington, VA (US)

( * ) Notice: Subject to any disclaimer, the term of this patent is extended or adjusted under 35 U.S.C. 154(b) by 359 days.

(21) Appl. No.: 18/484,645

(22) Filed: Oct. 11, 2023

(65) Prior Publication Data

US 2025/0121954 A1 Apr. 17, 2025

(51) Int. Cl.

*B64D 45/00* (2006.01)
*E05D 15/26* (2006.01)
*E06B 3/48* (2006.01)

(52) U.S. Cl.

CPC ..... *B64D 45/0026* (2019.08); *B64D 45/0028* (2019.08); *E05D 15/26* (2013.01); *E06B 3/48* (2013.01)

(58) Field of Classification Search

CPC ..... E06B 3/481; E06B 3/509; B64D 11/0023; B64D 45/0026; B64C 1/1469; E05D 15/58; E05D 15/581; E05D 15/0604

See application file for complete search history.

(56) References Cited

U.S. PATENT DOCUMENTS

| | | | | |
|---|---|---|---|---|
| 8,671,633 B2 * | 3/2014 | Haab | E05D 15/0604 160/206 |
| 10,111,538 B2 * | 10/2018 | Weiss | E05F 17/004 |
| 10,400,493 B2 * | 9/2019 | Gabl | E06B 3/5072 |
| 11,008,791 B2 * | 5/2021 | Rupp | E06B 3/5045 |
| 11,591,090 B2 * | 2/2023 | Bonnefoy | B64D 11/0606 |
| 12,258,127 B2 * | 3/2025 | McIntosh | B64D 11/02 |

(Continued)

FOREIGN PATENT DOCUMENTS

| | | | |
|---|---|---|---|
| EP | 3546690 B1 | 3/2021 | |
| FR | 1252817 A | 2/1961 | |
| WO | WO-2020183349 A1 * | 9/2020 | E05D 15/58 |

OTHER PUBLICATIONS

EP Search Report mailed Feb. 20, 2025 in re EP Application No. 24204623.3.

*Primary Examiner* — Abe Massad

(74) *Attorney, Agent, or Firm* — COATS & BENNETT, PLLC

(57) ABSTRACT

A barrier door system to control movement of persons through an opening within a cabin area of an aircraft. The barrier door system includes a track with an elongated shape with a first end and a second end. A barrier door includes panels that are pivotally connected together and one or more pins that extend outward from a top edge of the barrier door and are configured to engage with the track. The panels are configured to pivot together in a folded configuration at a stowed position, and to pivot outward away from the track in an extended configuration to extend across the opening at the deployed position.

20 Claims, 12 Drawing Sheets

(56) References Cited

U.S. PATENT DOCUMENTS

| | | | | |
|---|---|---|---|---|
| 12,291,351 | B2 * | 5/2025 | McIntosh | B64D 11/0691 |
| 12,497,173 | B2 * | 12/2025 | Rees | B64D 11/0606 |
| 2003/0127562 | A1 | 7/2003 | Pereira et al. | |
| 2006/0145007 | A1 | 7/2006 | Melberg et al. | |
| 2007/0034742 | A1 | 2/2007 | Jaeger et al. | |
| 2014/0123571 | A1 * | 5/2014 | Swain | B64D 11/0023<br>29/401.1 |
| 2016/0076291 | A1 | 3/2016 | Kleiman | |
| 2016/0194068 | A1 | 7/2016 | Savian et al. | |
| 2016/0251885 | A1 * | 9/2016 | Conley | E05F 11/42<br>49/127 |
| 2016/0332718 | A1 | 11/2016 | Guering | |
| 2017/0009504 | A1 | 1/2017 | Colacecchi | |
| 2017/0225787 | A1 | 8/2017 | Schliwa et al. | |
| 2018/0125236 | A1 * | 5/2018 | Grela | E05D 11/00 |
| 2018/0265216 | A1 | 9/2018 | Breigenzer | |
| 2020/0108907 | A1 | 4/2020 | Movsesian et al. | |
| 2021/0291955 | A1 | 9/2021 | Breigenzer et al. | |
| 2022/0332423 | A1 | 10/2022 | Thomas et al. | |
| 2022/0355949 | A1 | 11/2022 | Reinck et al. | |
| 2023/0047018 | A1 | 2/2023 | Chadwell | |

* cited by examiner

TRANSLATING BARRIER FOR AN AIRCRAFT

TECHNOLOGICAL FIELD

The present disclosure relates generally to the field of aircraft and, more specifically, to a barrier door system to prevent access to a flight deck of an aircraft.

BACKGROUND

Aircraft have a flight deck that includes flight instruments, instrument panels, and various controls that enable the flight personnel to operate the aircraft. The flight deck is positioned towards the front of the aircraft and is usually a separate compartment away from the cabin area where passengers sit during flight. A flight deck door further separates the flight deck from the cabin area.

The flight deck door is closed and locked during flight. This allows the flight personnel to concentrate on operating the aircraft and prevents entry of unauthorized persons onto the flight deck. However, the flight deck door may be opened during flight for various reasons. One occurrence is when flight personnel use the lavatory which is located in the cabin area of the aircraft. Other occurrences are when food and/or drinks that are prepared in the galley of the cabin area are delivered to the flight personnel on the flight deck, and when flight personnel leave the flight deck during a break.

Opening of the flight deck door could present an opportunity for an unauthorized person to gain entry to the flight deck.

A physically installed system is needed that would inhibit and/or sufficiently delay a person in the cabin area from reaching the flight deck door when the flight deck door is open. The delay in their movement towards the flight deck would allow the flight deck door to be closed and locked prior to the person reaching the door.

SUMMARY

One aspect is directed to a barrier door system to control movement of persons through an opening within a cabin area of an aircraft. The barrier door system comprises a track with an elongated shape comprising a first end configured to be located away from the opening and a second end configured to be located in proximity to the opening. A barrier door comprises a plurality of panels that are pivotally connected together and one or more pins that extend outward from a top edge of the barrier door and are configured to engage with the track. The plurality of panels are configured to pivot together in a folded configuration at the stowed position. The plurality of panels are configured to pivot outward away from the track in an extended configuration to extend across the opening at the deployed position.

In another aspect, the one or more pins extend outward from a single one of the plurality of panels.

In another aspect, the track comprises a top side, a first lateral side and a second lateral side that are spaced apart and extend from the top side, and an opening formed between distal ends of the first lateral side and the second lateral side with the opening comprising a first width and the one or more pins comprise a second width with the second width being greater than the first width to maintain the one or more pins engaged to the track when moving between the stowed position and the deployed position.

In another aspect, a notch is positioned in the first lateral side of the track and in closer proximity to the second end than to the first end with the notch having a width that is greater than the second width for one of the pins to move through when moving the barrier door from the folded configuration to the extended configuration.

In another aspect, the plurality of panels are aligned parallel to one another in the folded configuration.

In another aspect, a lock is positioned on a forward side of the barrier door and away from a rear side of the barrier door with the lock configured to maintain the barrier door in the extended configuration.

In another aspect, wheels are mounted to the barrier door and extend outward from a bottom edge of the barrier door.

One aspect is directed to a barrier door system to control movement of persons through an opening within a cabin area of an aircraft. The barrier door system comprises a track comprising an interior space positioned within a body. A barrier door is mounted to the track with the barrier door comprising a first panel, one or more additional panels connected to the first panel, and a first pin and a second pin that extend outward from a top edge of the first panel with the first pin and the second pin sized to fit within the interior space of the track. The barrier door is configured to move along the track and configurable between a folded configuration and an extended configuration. The folded configuration comprises both the first pin and the second pin positioned within the interior space and the first panel and the one or more additional panels folded together. The extended configuration comprises the first pin positioned within the interior space and the second pin positioned out of the interior space and away from the track with the barrier door pivoted relative to the track and with the first panel and the one or more additional panels being unfolded to extend across the opening.

In another aspect, the first pin comprises a greater length than the second pin and extends outward from the top edge of the first panel a greater distance than the second pin.

In another aspect, the first panel and the one or more additional panels are pivotally connected together and are in an overlapping arrangement in the folded configuration and are in an end-to-end arrangement in the extended configuration.

In another aspect, a notch extends through the body of the track with the notch comprising a greater width than the second pin for the second pin to move through the notch when moving the barrier door from the folded configuration to the extended configuration.

In another aspect, the body of the track comprises a top side, a first lateral side and a second lateral side that are spaced apart and that extend from the top side, and an opening formed between distal ends of the first lateral side and the second lateral side and the notch extends through the first lateral side.

In another aspect, the first pin and the second pin each comprise a neck that extends outward from the top edge of the first panel and a head positioned at an end of the neck with the head comprising a greater width than the neck.

In another aspect, wheels are positioned along a bottom edge of the barrier door.

In another aspect, a lock is positioned on the barrier door with the lock being exposed on just a front side of the barrier door.

One aspect is directed to a method of controlling movement of passengers through an opening within a cabin area of an aircraft. The method comprises: locating a barrier door that is mounted to a track at a stowed position along the track that is away from the opening with the barrier door in a folded configuration; translating the barrier door along the track away from the stowed position to a deployed position while the barrier door remains engaged with the track; and after moving the barrier door to the deployed position, pivoting the barrier door relative to the track and extending the barrier door to an extended configuration and extending the barrier door across the opening.

In another aspect, the method further comprises pivoting a first panel of the barrier door relative to the track and moving a second pin that extends outward from the first panel through a notch in the track while maintaining a first pin that extends from the first panel engaged with the track.

In another aspect, the method further comprises pivoting the barrier door to the extended configuration across the opening and aligning the barrier door perpendicular to the track.

In another aspect, the method further comprises sliding the barrier door from a first end of the track at the stowed position to a second end of the track at the deployed position.

In another aspect, the method further comprises sliding the barrier door from the stowed position that is in proximity to a flight deck to the deployed position at a front of a passenger section of the cabin area.

The features, functions and advantages that have been discussed can be achieved independently in various aspects or may be combined in yet other aspects, further details of which can be seen with reference to the following description and the drawings.

DETAILED DESCRIPTION

Figure 1:
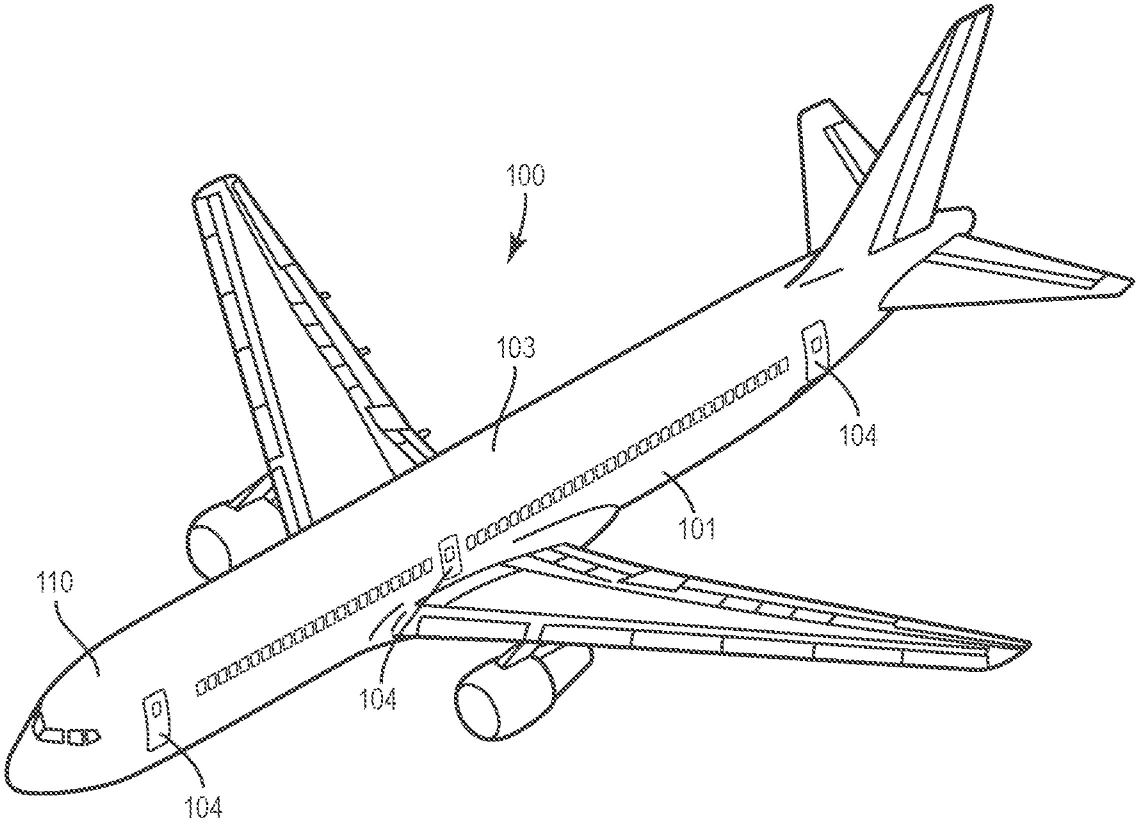
FIG. 1 is an isometric view of an aircraft.
Figure 2:
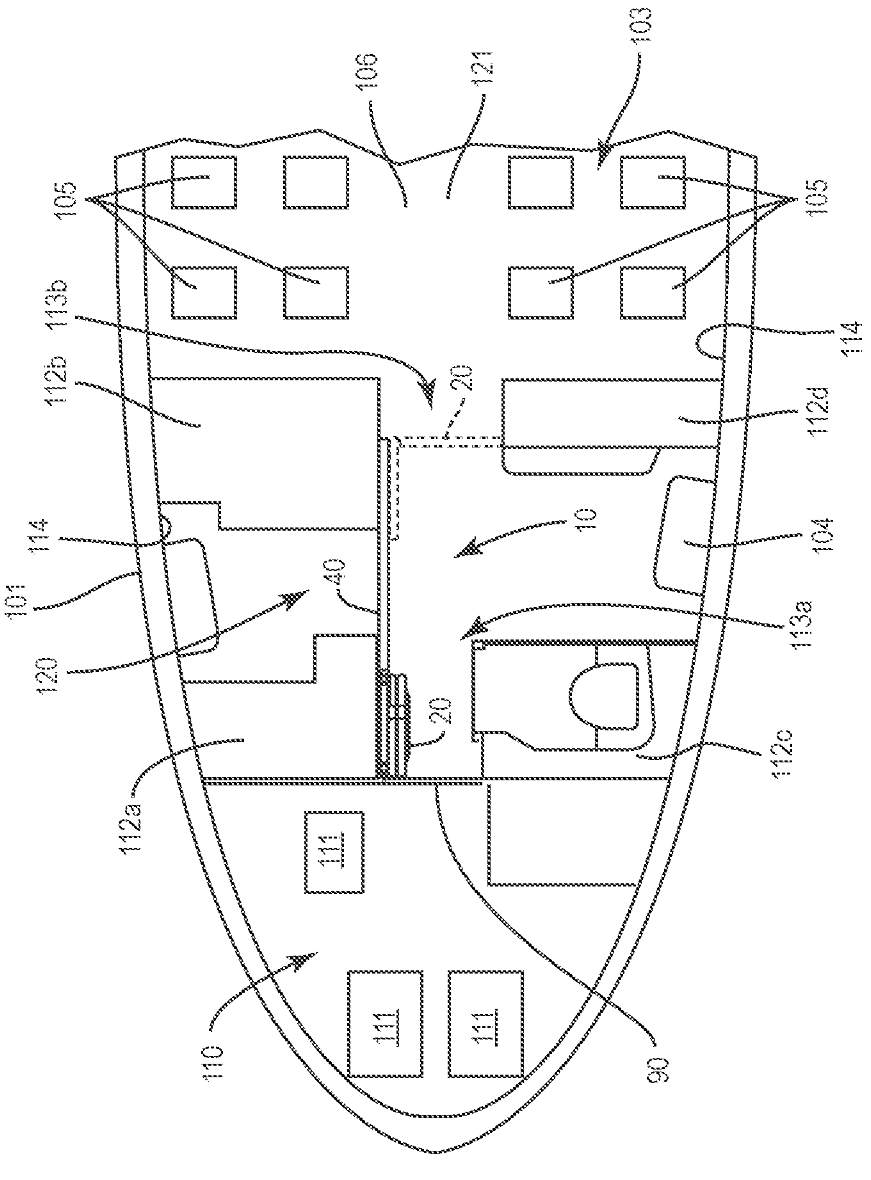
FIG. 2 is a schematic drawing of an interior of an aircraft that includes a barrier door system.

FIGS. 1 and 2 illustrate an aircraft 100 configured to transport passengers. The aircraft 100 includes a fuselage 101 with a flight deck 110 positioned at the front and a cabin area 103 positioned rearward. The cabin area 103 is equipped for accommodating the passengers. The size of the flight deck 110 and the cabin area 103 can vary depending upon the aircraft 100. One or more exterior doors 104 provide for passengers and the flight personnel to enter and exit the fuselage 101.

The flight deck 110 includes one or more seats 111 for flight personnel including but not limited to the pilot, co-pilot, and other authorized persons. Various controls and instrument panels (not illustrated) are located for use by the flight personnel to control the aircraft 100.

The cabin area 103 is positioned along the fuselage 101 rearward of the flight deck 110. The cabin area 103 includes a passenger section 121 with seats 105 arranged in rows along one or more aisles 106. In some examples such as a commercial airline, the seats 105 extend throughout the cabin area 103. In other examples in which the aircraft 100 is used for cargo transport, a limited number of seats 105 are positioned in the cabin area 103.

Monuments 112 are mounted to the structural members of the aircraft 100 within the fuselage 101. The monuments 112 are shaped and sized for a function with examples including but not limited to galleys, lavatories, walls, and stowage units. In some examples, the monuments 112 are shaped and sized to extend from the floor to the ceiling of the cabin area 103, and between a wall 114 of the fuselage 101 to an aisle 106.

In some examples, the cabin area 103 includes a vestibule 120 positioned between the flight deck 110 and the passenger section 121. In some examples, the vestibule 120 is positioned at one of the exterior doors 104 and includes space to allow for passengers to enter and exit the aircraft 100. Additionally or alternatively, the vestibule 120 provides an area for flight personnel to sit during takeoff and landing, for the flight personnel to prepare food/drinks, and for passengers to access a lavatory. FIG. 2 includes the vestibule 120 having a pair of galley monuments 112*a*, 112*b*, a lavatory monument 112*c*, and a stowage monument 112*d*. In other examples, the cabin area 103 does not include a vestibule with the passenger section 121 including the seats 105 extending directly behind the flight deck 110.

One or more openings 113 are formed within the cabin area 103. In some examples as illustrated in FIG. 2, the openings 113 are formed between the monuments 112. The openings 113 form walkways for passengers and flight personnel to move within the cabin area 103. FIG. 2 illustrates a layout with a pair of openings-opening 113*a* formed closer to the flight deck 110 and opening 113*b* closer to the passenger section 121. Other examples include openings 113 formed between various components, such as monuments 112, walls 114 of the fuselage 101, and seats 105.

Figure 3:
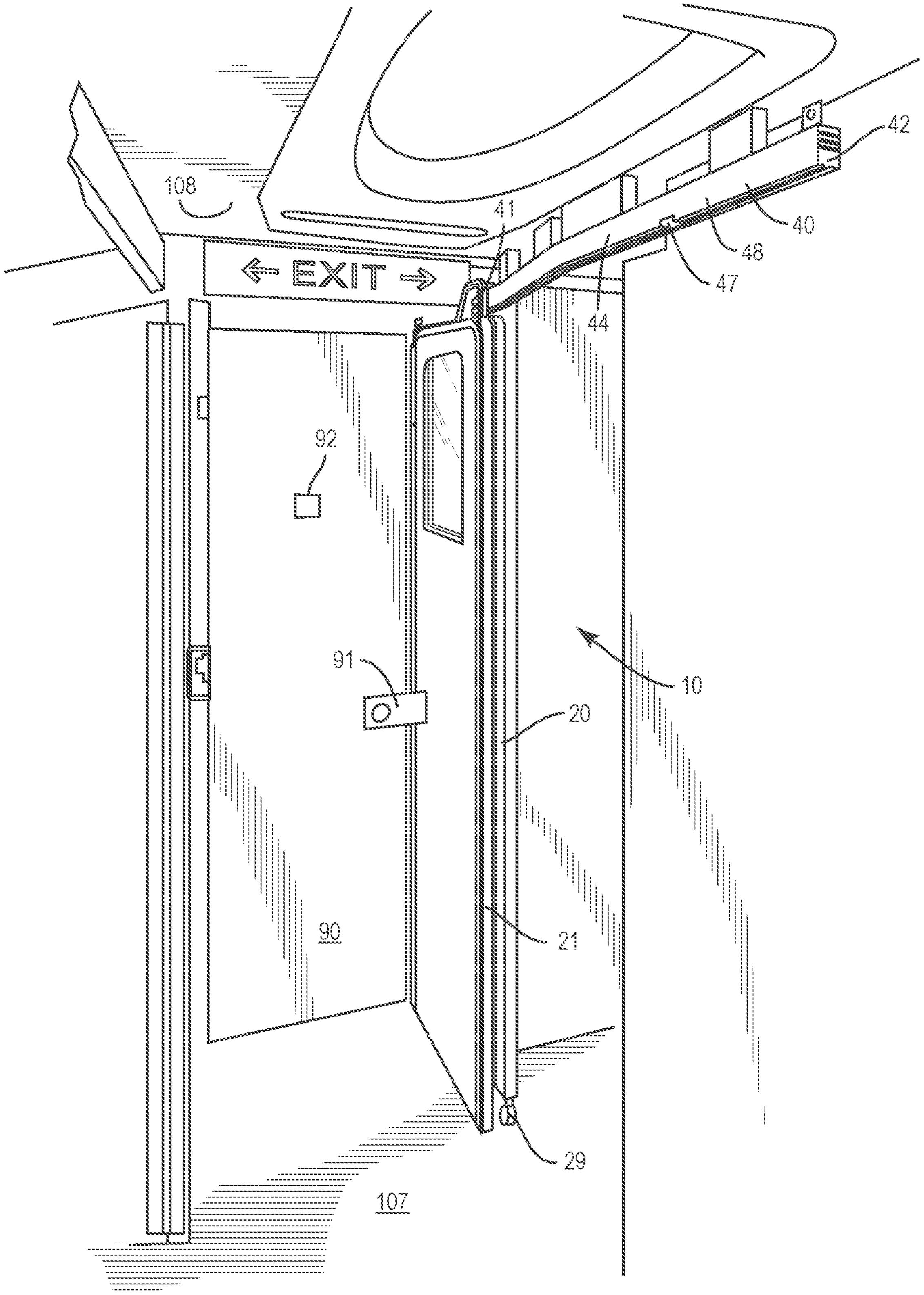
FIG. 3 is a perspective view of a barrier door system positioned in proximity to a flight deck door within an interior of an aircraft.

As illustrated in FIGS. 2 and 3, a flight deck door 90 separates the flight deck 110 from the cabin area 103. In some examples the flight deck door 90 separates the flight deck 110 from the vestibule 120. The flight deck door 90 prevents unauthorized persons from entering the flight deck 110 from the cabin area 103. As illustrated in FIG. 3, the flight deck door 90 includes a lock 91 configured to secure the door 90 in the closed position. The lock 91 can include various configurations for unlocking, such as a magnetic card reader and input buttons. A flight deck door viewing hole 92 provides for the flight personnel on the flight deck 110 to see into the cabin area 103 without opening the door 90.

The present application is directed to a barrier door system 10 configured to delay and/or prevent a passenger in the cabin area 103 from moving through an opening 113 and gaining access to the flight deck 110. The barrier door system 10 includes a barrier door 20 that can be deployed across the opening 113. The barrier door 20 functions to delay the movement of a person moving from the cabin area 103 towards the flight deck 110.

Figure 4:
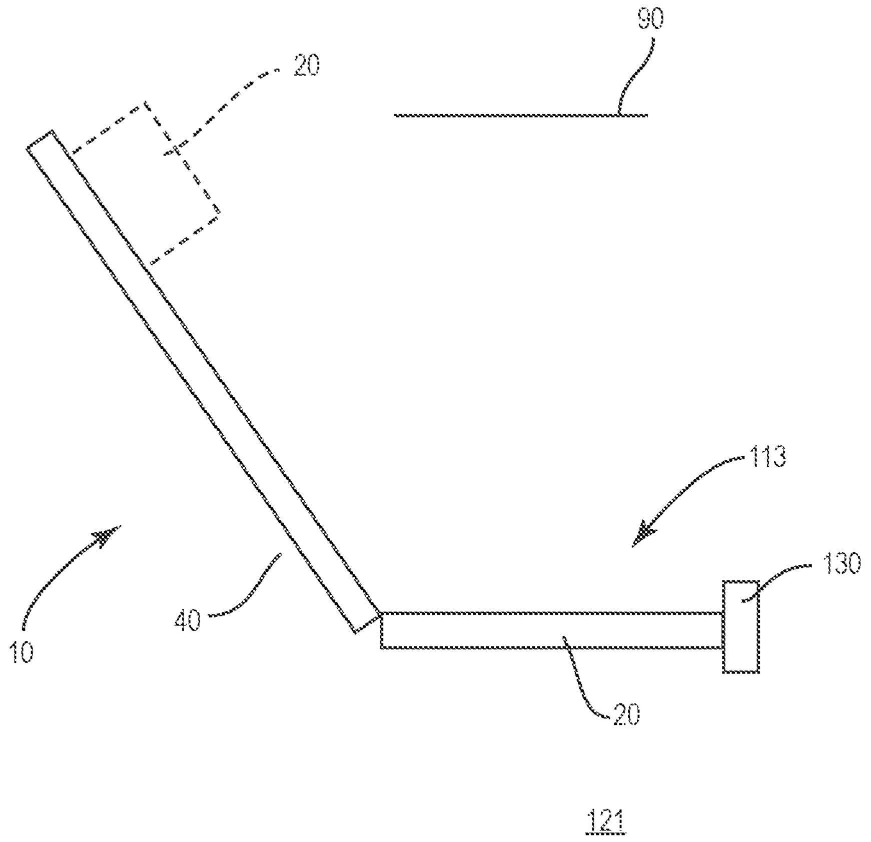
FIG. 4 is a schematic diagram of a barrier door system positioned at an opening within an interior of an aircraft.

FIG. 4 schematically illustrates a barrier door system 10 that includes a barrier door 20 that is movable along a track 40 between a stowed position (shown in dashed lines) and a deployed position shown in solid lines. In the stowed position, the barrier door 20 is positioned away from the opening 113. In the deployed position, the barrier door 20 is positioned across the opening 113. In some examples, the barrier door 20 can be arranged in a folded configuration to have a smaller overall size to facilitate storage when in the stowed position. The barrier door 20 can also be arranged in an extended configuration at the deployed position to extend across the opening 113. The barrier door 20 can be configured to engage with a mount 130 positioned on an opposing side of the opening 113. In other examples, the barrier door 20 has the same configuration in both the stowed and deployed positions. The track 40 is mounted to the structure of the aircraft 100 and extends between the stowed position and the deployed position. The track 40 can be mounted to various structures including but not limited to the ceiling 108, monuments 112, and walls 114.

Figure 5:
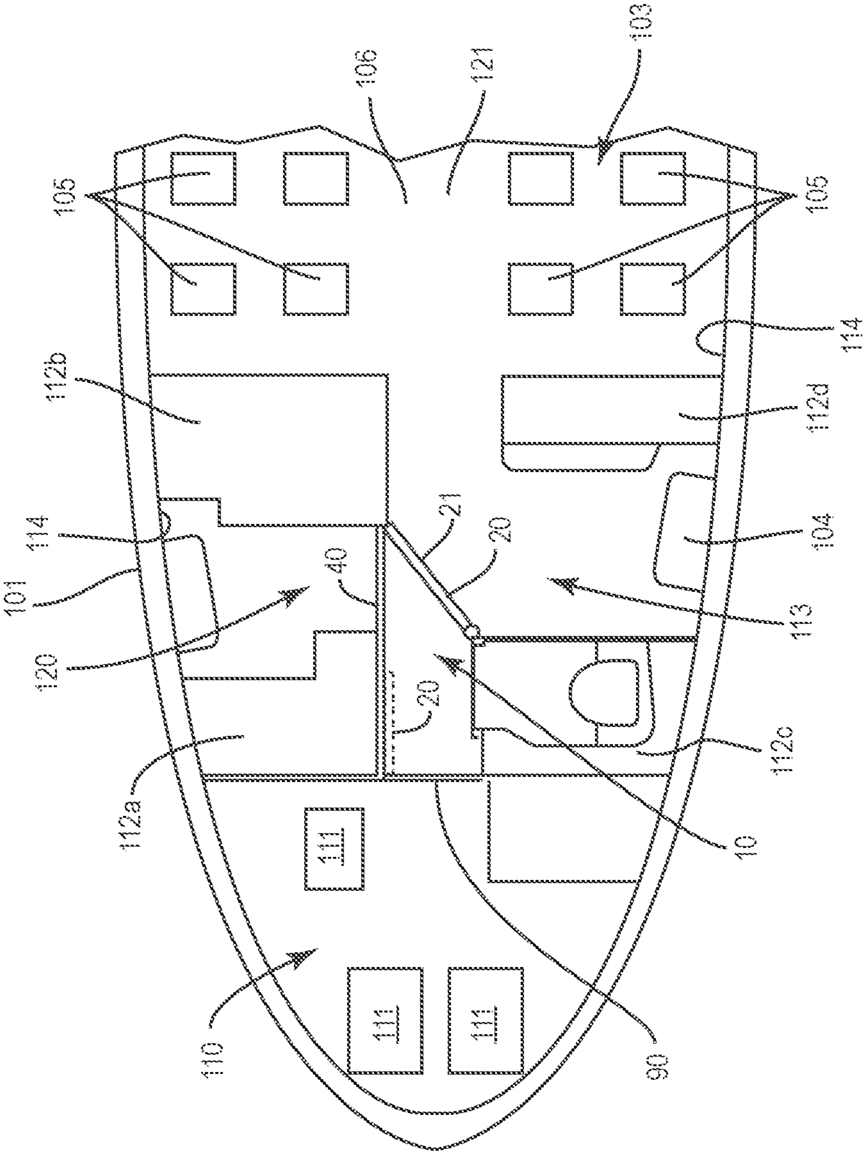
FIG. 5 is a schematic drawing of an interior of an aircraft that includes a barrier door system.

The aircraft 100 is configured for the barrier door 20 to be deployed across one or more openings 113. FIG. 2 illustrates an example in which the track 40 extends along a forward section of the cabin area 103 at the vestibule 120. The barrier door 20 is movable between a stowed position in proximity to the flight deck door 90 and a deployed position across an opening **113*b* formed between monuments 112*b*, 112*d*. FIG. 5 illustrates an example with the door 20 in the deployed position extending across an opening 113 formed between monuments 112*b*, 112*c*. In some examples, the barrier door 20 is configured to simultaneously extend across two or more openings 113** in the extended configuration.

Figure 6:
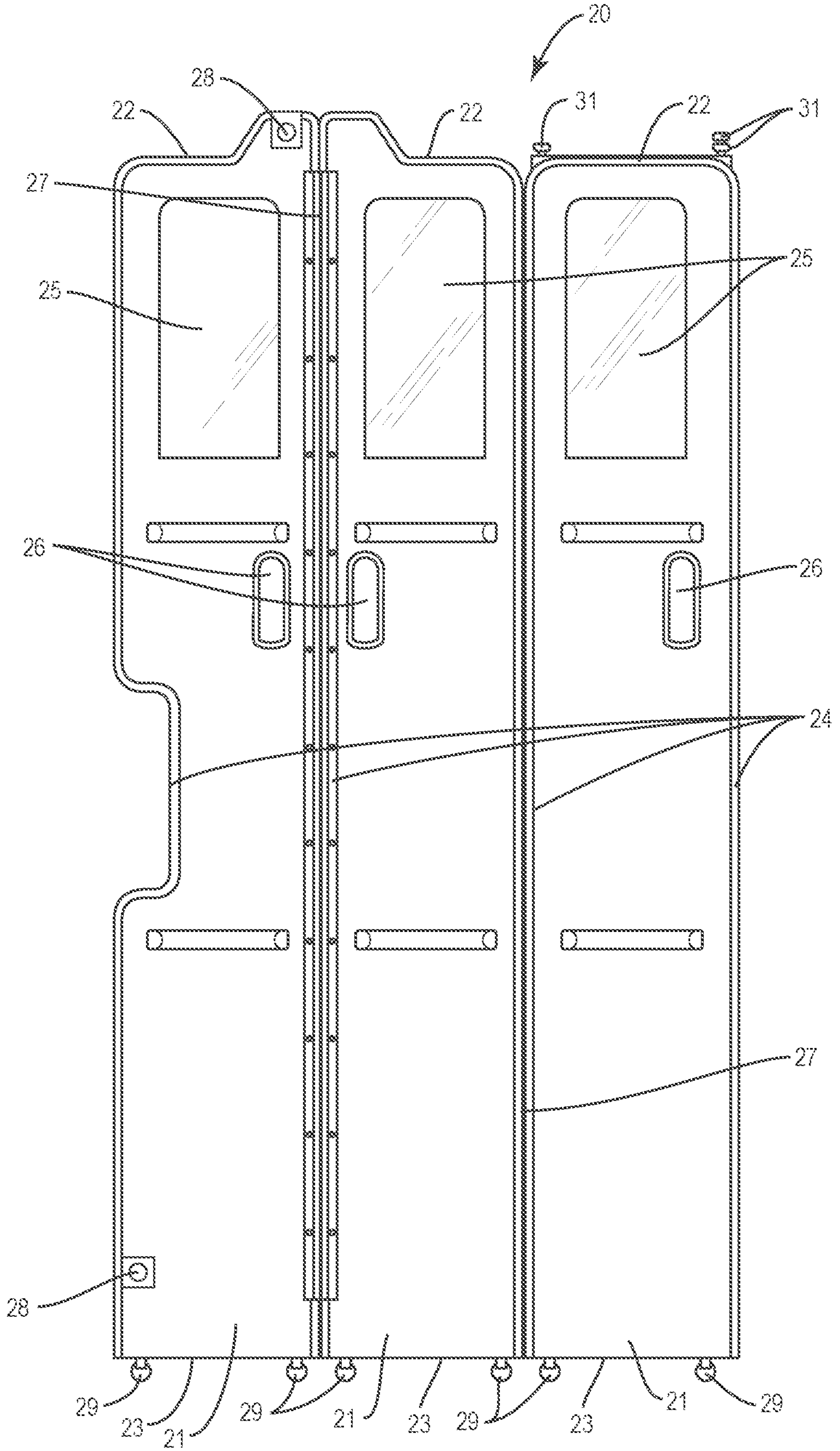
FIG. 6 is a side view of a barrier door in an extended configuration.

FIG. 6 illustrates a barrier door 20 in an extended configuration. The barrier door 20 includes panels 21 that are pivotally connected together to move between the stowed and deployed positions. The panels 21 include a top edge 22, bottom edge 23, and lateral edges 24. The size and shape of the panels 21 can vary to conform to the shape of the opening 113. The different panels 21 can include the same or different shapes and/or sizes. The panels 21 can be constructed from a variety of different materials. In some examples, the panels 21 are constructed from rigid, planar members constructed from various materials including but not limited to plastic and aluminum. In some examples, the panels 21 include a frame constructed from rigid elongated members and a fabric curtain that is attached to the elongated members.

Windows 25 can be positioned in one or more of the panels 21. In some examples, the windows 25 include a transparent sheet such as plexiglass. In other examples, the windows 25 are open. Handles 26 are included in one or more of the panels 21 to move the barrier door 20 between the folded and extended configurations and between the stowed and deployed positions. In some examples, the handles 26 include openings that extend through a central section of the panel 21 or include a cut out along a side of the panel 21. This provides for the faces of the panels 21 to abut together when folded in the stowed position (see FIG. 9). In other examples, the handles 26 are attached to and extend outward from one or more sides of the panels 21. In multiple-panel barrier doors 20, one or more hinges 27 provide for the pivoting movement of the panels 21.

In some examples, one or more locks 28 provide for securing the barrier door 20 in the extended configuration. In some examples, the locks 28 are accessible from just a front side of the barrier door 20 (i.e., the side that faces towards the flight deck 110 when in the deployed position). This positioning provides access to the locks 28 by flight personnel and prevents access by a passenger coming from the passenger section 121. The locks 28 are configured to engage with one or more of a monument 112, floor 107, ceiling 108, or other aircraft structure to secure the deployed position. In some examples, the locks 28 includes a hook that is rotatable between locked and unlocked positions, and a dial that is turned by the flight personnel to adjust the positioning. In another example, the locks 28 include a plunger that extends outward from the panel 21 to engage with a receptacle in the monument 112. In another example, the locks 28 include an elongated members such as a chain, cable, wire that connects to a clasp.

Wheels 29 are mounted to one or more of the panels 21 at the bottom edges 23. The wheels 29 are configured to provide for movement of the barrier door 20 along the floor 107 of the cabin area 103. In some examples, the wheels 29 are pivotally mounted to provide for the various movements between the folded and extended configurations and translation along the track 40. In some examples, the barrier door 20 is mounted to the aircraft 100 just through the pins 30 that engage with the track 40. The barrier door 20 is not mounted to the floor 107, but rather contacts the floor 107 through the wheels 29.

The barrier door 20 is engaged with the track 40 through one or more pins 30. The pins 30 extend outward from the top edge 22 or bottom edge 23 of one or more of the panels 21. In one example, pins 30 extend outward from a single panel 21. In other examples, pins 30 extend outward from multiple panels 21.

Figure 7:
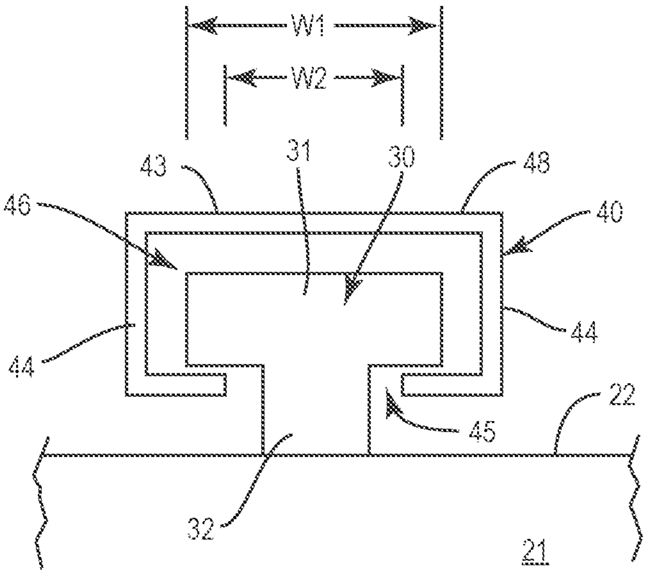
FIG. 7 is a schematic side view of a pin that extends from a panel of a barrier door and this is engaged in a track.
Figure 8:
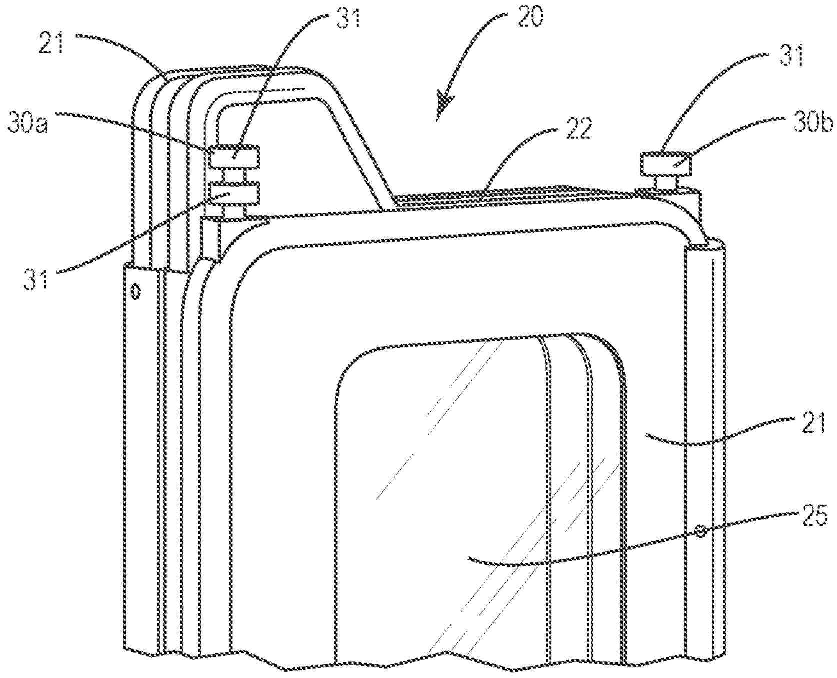
FIG. 8 is a partial isometric view of a pair of pins extending from a top edge of a panel of a barrier door.

FIG. 7 illustrates a schematic diagram of a pin 30 extending outward from the top edge 22 of a panel 21. The pin 30 includes a head 31 and a neck 32. The head 31 includes an enlarged width W1 that is larger than the width of the neck 32 and larger than a width W2 of an opening 45 in the track body 48. This maintains the head 31 in the track 40 when translating along the track 40. In some examples with multiple pins 30, each of the pins 30 has the same shape and size. In other examples as illustrated in FIG. 8, two or more of the pins 30 have different shapes and/or sizes. This provides for one or more of the pins 30 to remain within the track 40 and for one or more of the pins 30 to leave the track 40 when the barrier door 20 is being deployed. FIG. 8 includes pin **30*a* having two heads 31 and a longer length than pin 30*b* that includes a single head 31**.

The track 40 provides for translating the barrier door 20 between the stowed and deployed positions. As illustrated in FIG. 3, the track 40 include an elongated length with a first end 41 positioned in proximity to the stowed position and a second end 42 positioned in proximity to the deployed position. In some examples, the first and second ends 41, 42 are capped to prevent the pins 30 from escaping from the interior of the track 40.

The track 40 is shaped to provide for the pins 30 to be engaged and to translate along the length. As illustrated in FIGS. 3 and 7, the track 40 includes a track body 48 that is formed by one or more pieces. The track body 48 includes a top side 43 configured to mount to aircraft 100, such as to the ceiling 108. The track body 48 also includes opposing lateral sides with distal ends that are spaced apart to form an opening 45. The opening 45 forms a slot that extends along the length of the track 40. The track body 48 extends around an interior space 46 sized to hold the head 31 of the pin 30. The opening 45 includes width W2 that is smaller than the width W1 of the head 31 to prevent the head 31 from escaping through the opening 45.

As illustrated in FIG. 3, a notch 47 extends through a lateral side 44 and is in communication with the interior space 46. The notch 47 has a width that is greater than the width W1 of the head 31. This provides for the pin 30 to move through the notch 47 when the barrier door 20 is being deployed to the extended configuration. The notch 47 is in proximity to the second end 42 and spaced away from the first end 41.

The barrier door 20 is selectively positionable along the track 40 between the stowed position and the deployed position. In some examples, the stowed position is away from the opening 113. In one example as illustrated in FIGS. 2 and 3, the stowed position is in proximity to the flight deck 110. In one specific example, the stowed position is in the space directly outside of the flight deck door 90. In other examples, the stowed position is located in other places, such as but not limited to within a galley, within an opening in a monument 112, and along a side of one or more seats 105 in the passenger section 121. The stowed position provides for the opening 113 to be clear to allow for movement of persons on the aircraft 100.

Figure 9:
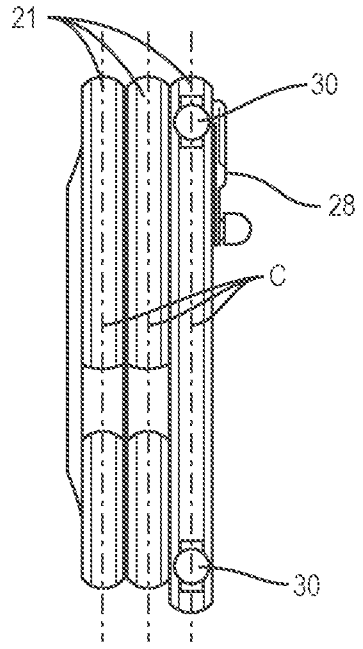
FIG. 9 is a top view of a barrier door in a folded configuration.

In some examples as illustrated in FIGS. 8 and 9, the barrier door 20 is in a folded configuration when stowed. The folded configuration includes the panels 21 folded together for the barrier door 20 to have a reduced size to further prevent interference with persons in the cabin area 103. In one example, the folded configuration includes the faces of the panels 21 contacting together. In one example as illustrated in FIG. 9, the panels 21 each have a centerline C that extends through the lateral edges 24. The centerlines C are arranged in a parallel configuration. In some examples, the centerlines C of the panels 21 are aligned parallel to a centerline of the track 40 in the folded configuration.

The deployed position locates the barrier door 20 in proximity to the opening 113. In some examples, the deployed position is within the opening 113. In other examples, the deployed position is away from the opening 113 but in close enough proximity for the barrier door 20 to extend across the opening in the extended configuration.

In some examples, the barrier door 20 is extended by the panels 21 being unfolded by pivoting about the hinges 27 to an elongated shape. In some examples, the panels 21 are aligned in an end-to-end arrangement with the lateral edges 24 aligned and the centerlines C in a straight line. The barrier door 20 has a length measured between the outer lateral edge of the first panel 21 and the outer lateral edge of the last panel 21 to extend from the track 40 across the opening 113.

Figure 10A:
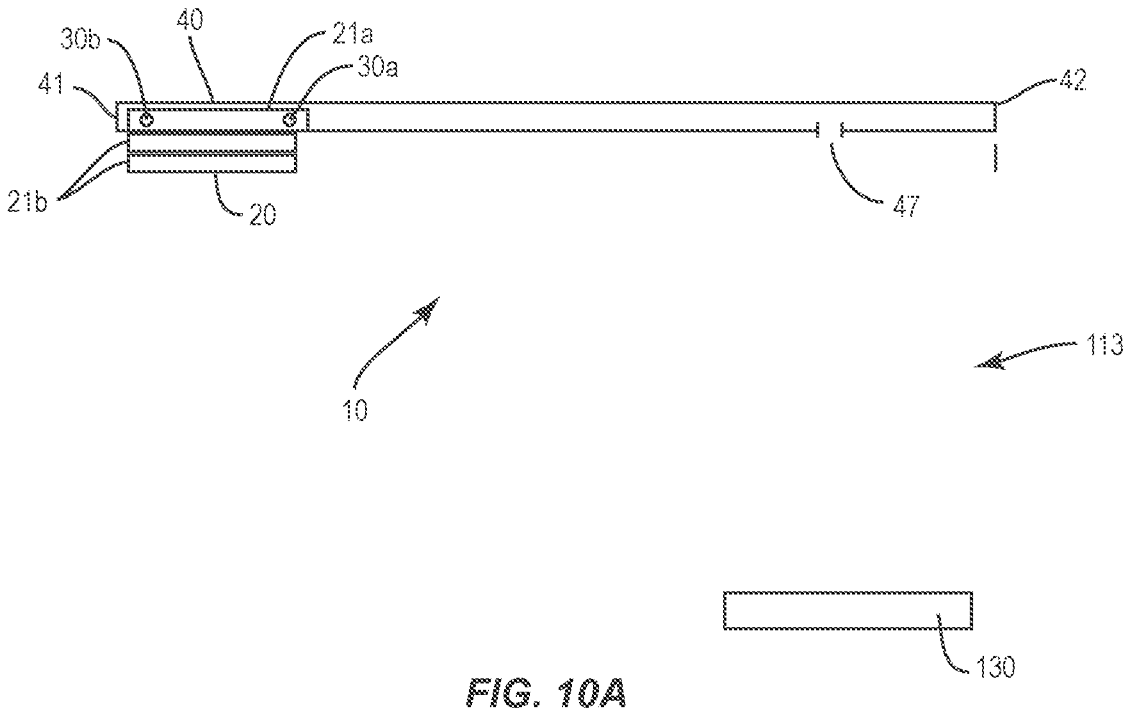
FIGS. 10A-10E are schematic diagrams illustrating a barrier door being deployed across an opening in an aircraft.

FIGS. 10A-10E illustrate deploying a barrier door 20. As illustrated in FIG. 10A, the barrier door 20 is located at the stowed position along the track 40. This positions the barrier door 20 away from the opening 113 to prevent interfering with persons that are moving through the opening 113. Pins 30*a*, 30*b* on the first panel 21*a* are engaged in the track 40. The other panels 21*b* are hingedly connected to the first panel 21*a* but not otherwise engaged with the track 40. The barrier door 20 is in a folded configuration to reduce the overall size to further prevent interfering with persons in the area and those moving through the opening 113.

Figure 10B:
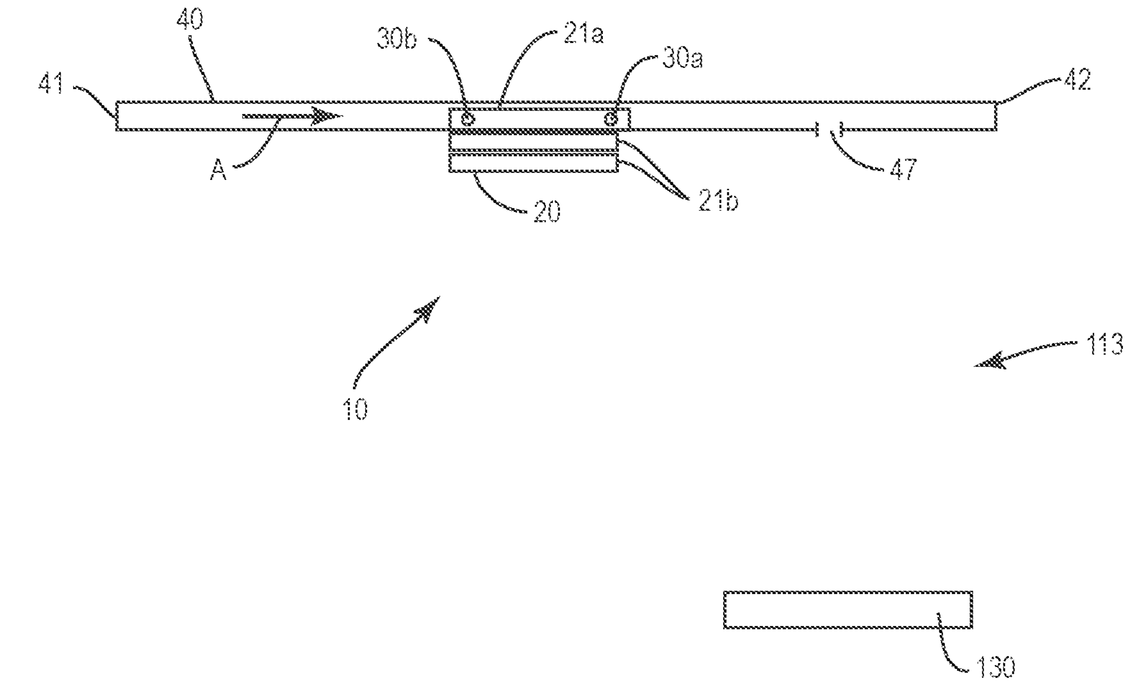
Figure 10C:
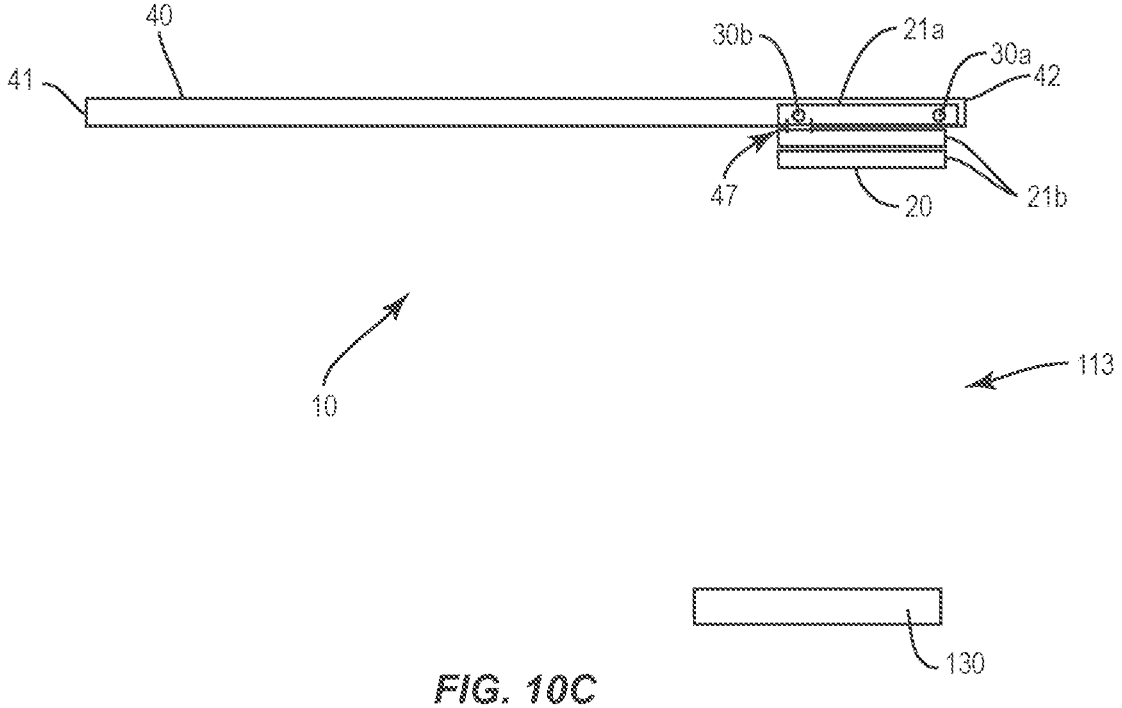

For deployment, the barrier door 20 is moved in the direction of arrow A along the track 40 as illustrated in FIG. 10B. This includes the first panel 21*a* sliding along the track 40 with the heads of the pins 30*a*, 30*b* sliding along the interior space. The barrier door 20 is moved along the track 40 to the deployed position as illustrated in FIG. 10C. In some examples, this includes the pin 30*a* contacting against an endcap mounted to the second end 42 of the track 40. The pins 30*a*, 30*b* remain engaged with the track 40 with pin 30*b* aligned with the notch 47.

Figure 10D:
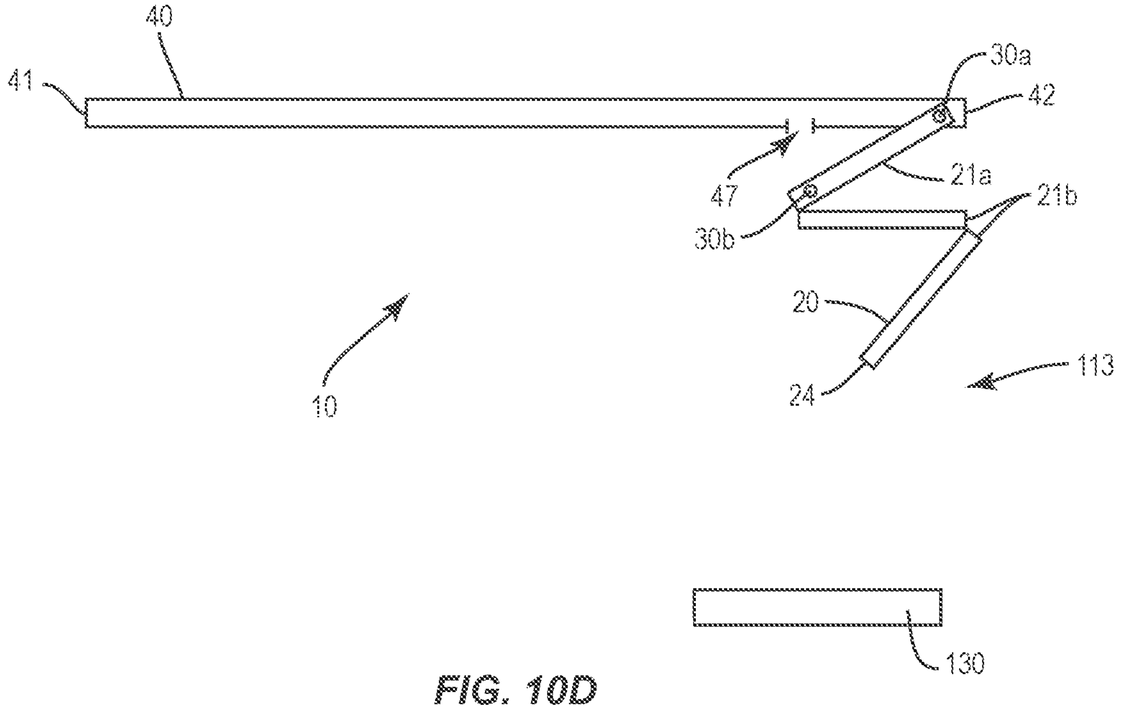
Figure 10E:
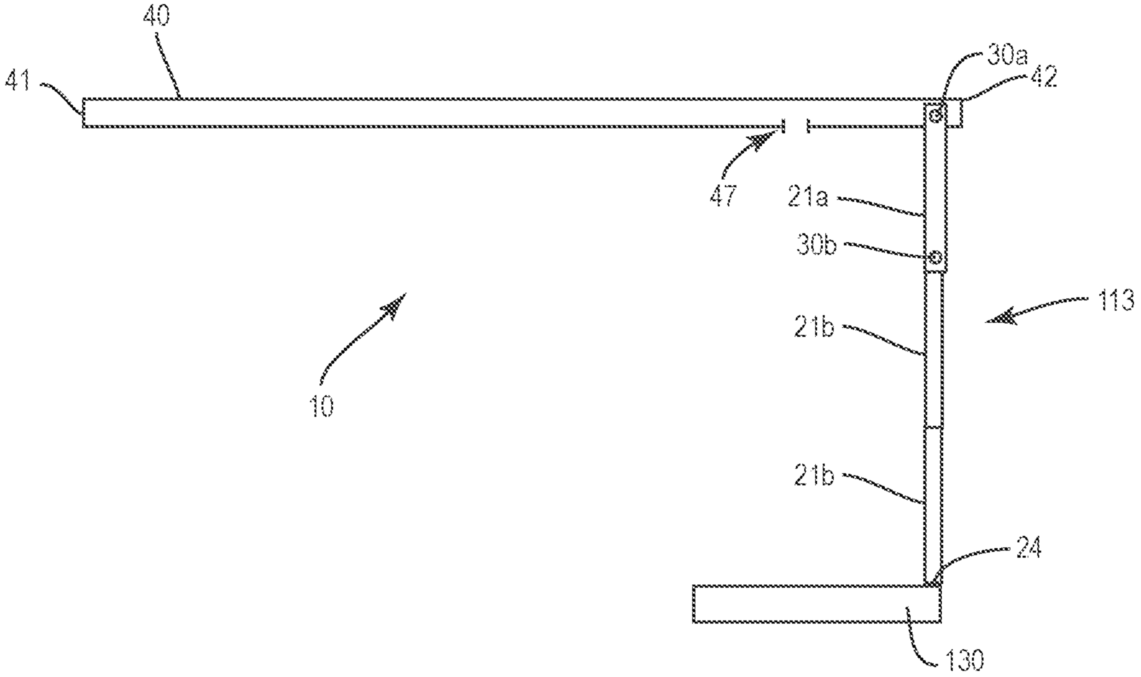

FIG. 10D illustrates the barrier door 20 being moved towards the extended configuration. This movement includes the first panel 21*a* pivoting about pin 30*a*. This pivoting movement causes pin 30*b* to move through the notch 47 to disengage the pin 30*b* from the track 40. The other panels 21*b* are unfolded to lengthen the overall length of the barrier door 20. As illustrated in FIG. 10E, the barrier door 20 is in the extended configuration to extend across the opening 113. An outer lateral edge 24 of the outer panel 21*b* is positioned at a mount 130 that forms the side of the opening 113. In some examples, the barrier door 20 is locked to the mount 130 in the extended configuration to maintain the position. In some examples as illustrated in FIG. 10E, the panels 21*a*, 21*b* are aligned in an end-to-end arrangement in a straight line. In some examples, centerlines C of the panels 21*a*, 21*b* are colinearly aligned. In other examples, the panels 21*a*, 21*b* are aligned in a non-parallel arrangement in the extended configuration. In some examples, the barrier door 20 is pivoted relative to the track 40 and is perpendicular to the track 40 in the extended configuration.

The barrier door 20 is returned to the stowed position in a reverse order. The panels 21*a*, 21*b* are folded back together and the pin 30*b* of panel 21*a* is moved through the notch 47 and back into the interior space 46. The panels 21*a*, 21*b* are then translated along the track 40 to the stowed position.

In some examples, the barrier door 20 is in the folded configuration when moving along the track 40 between the stowed position and the deployed position. In other examples, the barrier door 20 is partially or fully extended when moving along the track 40.

In some examples as illustrated in FIGS. 10A-10E, the barrier door 20 extends across a single opening 113 at the deployed position. In other examples, the barrier door 20 is sized to extend across two or more openings 113.

The barrier door 20 can include various numbers of panels 21. In some examples, the barrier door 20 includes a single panel 20. In other examples, the barrier door 20 includes two or more panels 21. In multi-panel barrier doors 20, the different panels 21 can includes the same or different shape and size.

Figure 11:
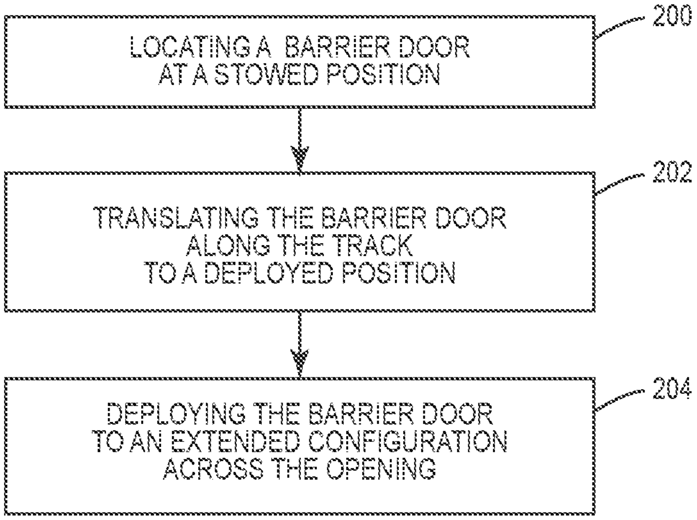
FIG. 11 is a flowchart diagram of a method of controlling movement of passengers through an opening within a cabin area of an aircraft.

FIG. 11 illustrates a method of controlling movement of passengers through an opening 113 within a cabin area 103 of an aircraft 100. The method includes locating a barrier door 20 that is mounted to a track 40 at a stowed position along the track 40 (block 200). The stowed position is away from the opening 113 and the barrier door 20 is in a folded configuration. The barrier door 20 is translated along the track 40 away from the stowed position to a deployed position while the barrier door 20 remains engaged with the track 40 (block 202). After moving the barrier door 20 to the deployed position, the barrier door 20 is pivoted relative to the track 40 (block 204). The barrier door 20 is moved to an extended configuration that extends across the opening 113.

The present invention may be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A barrier door system to control movement of persons through an opening within a cabin area of an aircraft, the barrier door system comprising:

a track with an elongated shape comprising a first end configured to be located away from the opening and a second end configured to be located in proximity to the opening;

a barrier door comprising:

a plurality of panels that are pivotally connected together, the panels comprising a first panel, a second panel, and one or more intermediate panels;

pins that extend outward from a top edge of the barrier door and are configured to engage with the track;

wherein the plurality of panels are configured to pivot together in a folded configuration at a stowed position with the pins engaged with the track; and wherein the plurality of panels are configured to pivot about one of the pins outward away from the track in an extended configuration to extend across the opening at a deployed position and with the second panel and the one or more intermediate panels spaced completely away from the track and with the one pin engaged with the track.

2. The barrier door system of claim 1, wherein the pins extend outward from just the first panel.

3. The barrier door system of claim 1, wherein the track comprises:

a top side;

a first lateral side and a second lateral side that are spaced apart and extend from the top side;

an opening formed between distal ends of the first lateral side and the second lateral side; and wherein the opening comprises a first width and the pins comprise a second width with the second width being greater than the first width to maintain the pins engaged to the track when moving between the stowed position and the deployed position.

4. The barrier door system of claim 3, further comprising a notch positioned in the first lateral side of the track and in closer proximity to the second end than to the first end, the notch having a width that is greater than the second width for a second one of the pins to move through when moving the barrier door from the stowed position to the deployed position.

5. The barrier door system of claim 1, wherein the plurality of panels are aligned parallel to one another in the folded configuration.

6. The barrier door system of claim 1, further comprising a lock positioned on a forward side of the barrier door and away from a rear side of the barrier door, the lock configured to maintain the barrier door in the extended configuration.

7. The barrier door system of claim 1, further comprising wheels mounted to the barrier door and that extend outward from a bottom edge of the barrier door.

8. A barrier door system to control movement of persons through an opening within a cabin area of an aircraft, the barrier door system comprising:

a track comprising an interior space positioned within a body; and a barrier door mounted to the track, the barrier door comprising:

a first panel comprising a leading edge of the barrier door;

a second panel comprising a trailing edge of the barrier door;

one or more additional panels connected to and positioned between the first panel and the second panel;

a first pin and a second pin that extend outward from a top edge of the first panel, the first pin and the second pin sized to fit within the interior space of the track;

the barrier door is configured to move along the track and configurable between a folded configuration and an extended configuration;

wherein in a stowed position, the barrier door is in the folded configuration with both the first pin and the second pin positioned within the interior space and the first panel aligned along the track and folded together with the one or more additional panels and the second panel;

wherein in a deployed position, the barrier door is in the extended configuration with the first pin positioned within the interior space and the second pin positioned out of the interior space and away from the track with the first panel pivoted outward relative to the track and with the first panel and the one or more additional panels being unfolded to extend across the opening; and wherein the second panel and the one or more additional panels are positioned away from the track in the deployed position.

9. The barrier door system of claim 8, wherein the first pin comprises a greater length than the second pin and extends outward from the top edge of the first panel a greater distance than the second pin.

10. The barrier door system of claim 8, wherein the first panel, the second panel, and the one or more additional panels are pivotally connected together and are in an overlapping arrangement in the folded configuration and are in an end-to-end arrangement in the extended configuration.

11. The barrier door system of claim 8, further comprising a notch that extends through the body of the track, the notch comprising a greater width than the second pin for the second pin to move through the notch when moving the barrier door from the stowed position to the deployed position.

12. The barrier door system of claim 11, wherein the body of the track comprises:

a top side;

a first lateral side and a second lateral side that are spaced apart and that extend from the top side;

an opening formed between distal ends of the first lateral side and the second lateral side; and wherein the notch extends through the first lateral side.

13. The barrier door system of claim 11, wherein the first pin and the second pin each comprise a neck that extends outward from the top edge of the first panel and a head positioned at an end of the neck with the head comprising a greater width than the neck.

14. The barrier door system of claim 8, further comprising wheels positioned along a bottom edge of the barrier door.

15. The barrier door system of claim 8, further comprising a lock positioned on the barrier door, the lock being exposed on just a front side of the barrier door.

16. A method of using the barrier door system of claim 1 and controlling movement of passengers through an opening within a cabin area of an aircraft, the method comprising:

locating the barrier door at the stowed position along the track that is away from the opening with the barrier door in the folded configuration;

translating the barrier door along the track away from the stowed position to the deployed position while the barrier door remains engaged with the track; and after moving the barrier door to the deployed position, pivoting the barrier door relative to the track and extending the barrier door to the extended configuration and extending the barrier door across the opening.

17. The method of claim 16, further comprising pivoting the first panel of the barrier door relative to the track and moving a second one of the pins that extends outward from the first panel through a notch in the track while maintaining the one pin that extends from the first panel engaged with the track.

18. The method of claim 16, further comprising pivoting the barrier door to the extended configuration across the opening and aligning the barrier door perpendicular to the track.

19. The method of claim 16, further comprising sliding the barrier door from a first end of the track at the stowed position to a second end of the track at the deployed position.

20. The method of claim 16, further comprising sliding the barrier door from the stowed position that is in proximity to a flight deck to the deployed position at a front of a passenger section of the cabin area.

* * * * *